United States Patent [19]
Beck et al.

[11] Patent Number: 5,515,423
[45] Date of Patent: May 7, 1996

[54] TWO-LINE TELEPHONE CONTROLLER

[75] Inventors: Gregory F. Beck, Laguna Hills;
Douglas L. Palmer, Foothill Ranch;
James A. Fontana, Mission Viejo;
Alistair Egan, Lake Forest; Richard D. Ray, Laguna Niguel; Lisa Walker, Capistrano Beach, all of Calif.

[73] Assignee: Canon Kabushiki Kaisha, Tokyo, Japan

[21] Appl. No.: 160,824

[22] Filed: Dec. 3, 1993

[51] Int. Cl.$^6$ .................................................. H04M 11/00
[52] U.S. Cl. ........................... 379/93; 379/94; 379/100
[58] Field of Search ................................ 379/93, 94, 95, 379/96, 97, 98, 99, 160, 163, 156; 395/325; 375/222

[56] References Cited

U.S. PATENT DOCUMENTS

| | | | |
|---|---|---|---|
| 3,771,134 | 11/1973 | Huettner et al. | 395/325 |
| 3,920,928 | 11/1975 | Lye | 379/163 |
| 4,578,537 | 3/1986 | Faggin et al. | 379/93 |
| 4,640,989 | 2/1987 | Riner et al. | 379/94 |
| 4,825,461 | 4/1989 | Kurita et al. | 379/93 |
| 4,924,494 | 5/1990 | Shung | 379/100 |
| 5,056,132 | 10/1991 | Coleman et al. | 379/95 |
| 5,056,133 | 10/1991 | Iida | 379/98 |
| 5,131,026 | 7/1992 | Park | 379/100 |
| 5,142,567 | 8/1992 | Watanabe | 379/100 |
| 5,151,972 | 9/1992 | Lorenz et al. | 379/93 |
| 5,224,155 | 6/1993 | Satomi et al. | 379/100 |
| 5,283,819 | 2/1994 | Glick et al. | 379/93 |

OTHER PUBLICATIONS

Duane Marcroft, "DAA Designers Guide," Sep., 1989.
"4LS User Manual", Version 1.0, Bicom Computer and Communications Systems, pp. 1–5.
"RC96ACL/RC144ACL Modem Designer's Guide", Rockwell International Digital Communications Division, published 1993.

Primary Examiner—Jason Chan
Attorney, Agent, or Firm—Fitzpatrick, Cella, Harper & Scinto

[57] ABSTRACT

A computer-controlled communication board which includes a data access arrangement which functions as an intermediary between multiple telephone lines, a data communication device such as a fax/modem/voice chipset, and a standard telephone handset. The data access arrangement has a line select switch which switchably connects one of the multiple telephone lines to the data communication device via a single transformer and associated 2/4 converter. Off-hook switches are provided for each telephone line so that the data communication device can cause the selected telephone line to go off-hook. Likewise, ring detectors are provided for each telephone line so that the data communication device can detect which of those lines is ringing. Telephone handset switches may be provided for each telephone line so that the telephone handset may be switchably connected to any one of the multiple telephone lines. The data access arrangement may be configured so that unused lines appear "busy" to incoming calls, or it may be configured in a voice local mode in which the telephone handset may be used for play out and recording of audio information.

49 Claims, 5 Drawing Sheets

TWO-LINE TELEPHONE CONTROLLER

BACKGROUND

1. Field of the Invention

The present invention concerns a telephonic communication apparatus in which a data modem or the like is selectably switchable, under computer control, to any one of multiple telephone lines. More particularly, the invention concerns a two-by-two switching matrix that functions as an intermediary between two standard telephone lines, a fax/modem/voice chipset and a standard telephone handset.

2. Description of the Related Art

There are many communication control board products adapted for use with computing equipment such as an IBM PC and PC-compatible computers. These boards perform integrated modem/facsimile/ telephone control functions. When connected to an ordinary voice telephone line and to an ordinary telephone handset, such communication boards allow a computer to send and receive facsimile transmissions via a fax modem, to send and receive data transmissions via a data modem, and to send and receive voice telephone communications either via a digitized voice file stored on the computer or via the analog telephone handset. A single line controller is described in U.S. application Ser. No. 08/005,554, filed Jan. 19, 1993, commonly assigned herewith, the contents of which are incorporated herein by reference.

Computer users today ordinarily have more than one telephone line available to them. They use these multiple telephone lines to permit the computer to transmit fax/modem/voice messages over one telephone line at the same time as an ordinary voice conversation is conducted on a telephone handset over a second telephone line. But because conventional communication boards, which support only one telephone line, require connection to the telephone handset, this flexibility is lost. This is particularly the case in situations where a user desires the computer to control operations of the ordinary telephone handset, such as by automatic dialing from the computer or automatically maintaining telephone usage statistics.

SUMMARY OF THE INVENTION

It is an object of the invention to address the foregoing difficulties through the provision of a two-line telephone controller.

In one aspect, the invention provides a data access arrangement for a computer-controllable communication board in which the data access arrangement functions as an intermediary between two standard telephone lines, a fax/modem/voice chipset and a standard telephone handset. Under computer control, the data access arrangement switchably connects any of multiple telephone lines to an ordinary telephone handset or to a fax/modem/voice chipset. With this arrangement, a computer user can utilize the computer to control both fax/modem/voice communications as well as to control an ordinary telephone handset, and at the same time allow simultaneous use of those devices.

More particularly, a communication board according to the invention includes a data access arrangement having a line select switch which switchably connects one of multiple telephone lines to a data communication device, such as connecting one of multiple telephone lines to a fax/modem/voice chipset, via a single transformer and associated 2/4 converter. Off-hook switches, controllable by the data communication device, are provided for each telephone line so that the data communication device can cause the selected telephone line to go off-hook. Likewise, ring detectors are provided for each telephone line so that the data communication device can detect which one of those lines is ringing. Telephone handset switches may be provided for each telephone line so that a telephone handset may be switchably connected to a selected one of the telephone lines. The handset switches are preferably controlled such that the telephone handset is not connected to the telephone line currently engaged in data communication.

In operation, a ringing signal on one of the multiple telephone lines is detected, and a determination is made as to which line is ringing. The line select switch and the telephone handset switch are switched to the ringing line. If the user does not lift the handset within a predetermined period, such as two rings, the data communication device is caused to go off-hook.

A local voice mode is also provided whereby the communication board can be used for local play out and recording of audio information.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
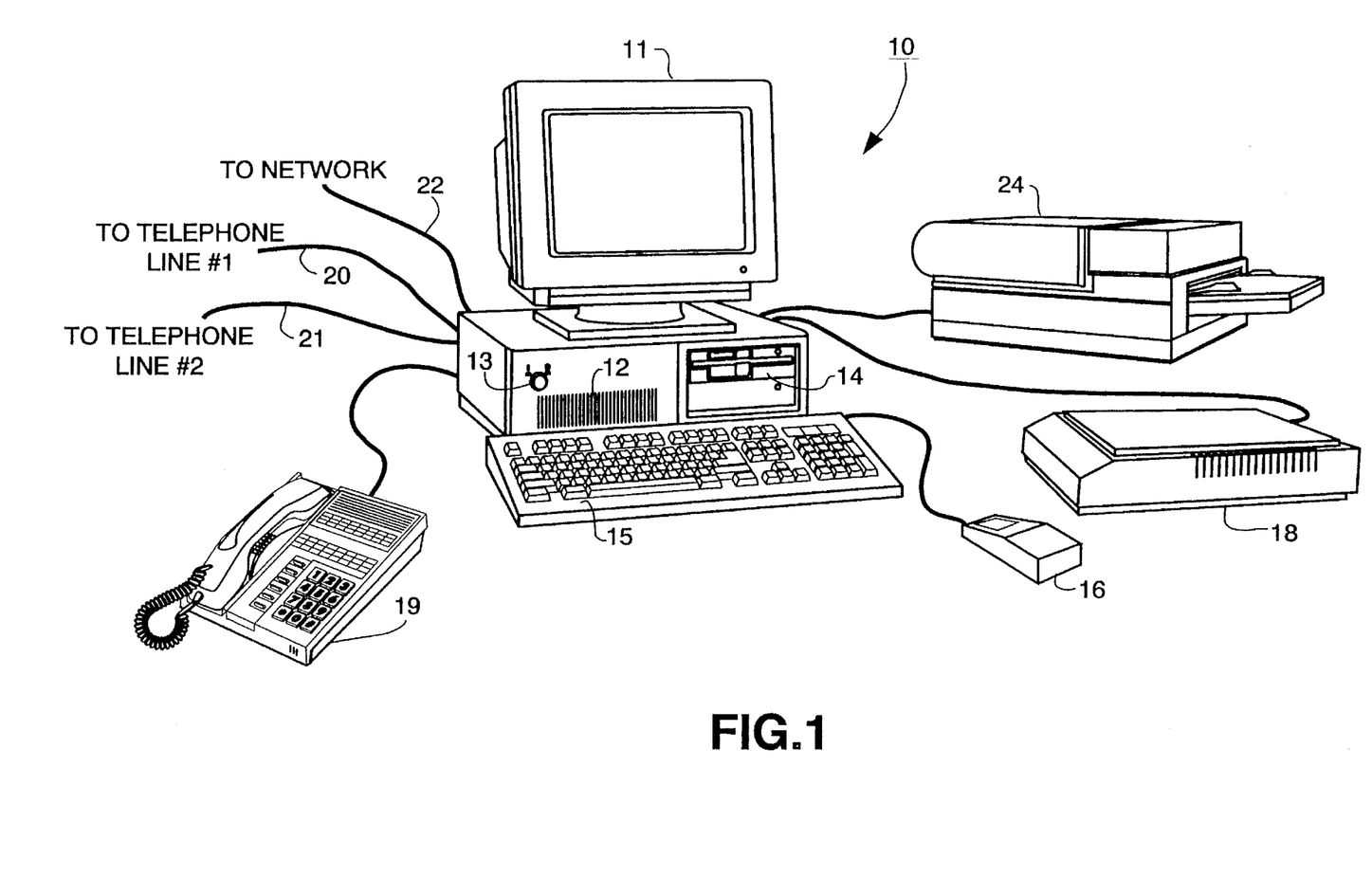
FIG. 1 is a perspective view of the outward appearance of an apparatus illustrative of a communication arrangement for personal computing equipment in which the present invention is incorporated.

FIG. 1 is a view showing the outward appearance of a representative embodiment of the invention. Shown in FIG. 1 is computing equipment 10 such as an IBM PC or PC-compatible computer having an operating system such as a Microsoft Windows operating system. The computing equipment 10 is provided with a display screen 11 such as a color monitor, a speaker 12 and a microphone 13. Computing equipment 10 further includes a mass storage device such as a computer disk drive 14 for storing data files such as bitmap image data files, text data files, sound (e.g., PCM or pulse code modulation) data files, animation data files and digital motion video data files, in compressed or uncompressed format; and for storing application program files such as a multimedia message management program that can send and receive the aforementioned types of data files, or other information processing program files which contain stored program instruction steps by which computing equipment 10 manipulates data files, presents data in those files to an operator via display screen 11 or speaker 12, or transmits data via telephone lines or network interfaces, or the like.

Keyboard 15 is connected to computing equipment 10 to permit input of text data and to permit operator selection and manipulation of objects displayed on display screen 11. Likewise, pointing device 16 such as a mouse or the like is connected to permit selection and manipulation of objects on the display screen. Scanner 18 scans documents or other images and provides bitmap images of those documents to computing equipment 10. Network interface line 22 connects computing equipment 10 to an unshown local area network, and printer 24 is provided for outputting information processed by computing equipment 10.

An unshown communication board, which is described in considerable detail below, connects computing equipment 10 to an ordinary telephone handset 19 as well as to a multiple telephone lines, here two telephone lines 20 and 21.

In accordance with operator instructions, stored application programs are activated and permit processing and manipulation of data. For example, any of a variety of application programs such as a multimedia message management program, a word processing program, an image editing program, spreadsheet programs, and similar information processing programs, may be provided for operator selection and use. Thus, a word processing program may be activated to permit an operator to create, view, manipulate and print documents, and to send or receive documents via a communication board and one of the multiple telephone lines. Likewise, a multimedia message management program may be activated to permit an operator to create, manipulate and view multimedia documents which contain a variety of objects such as text objects, bitmap objects, computer graphic objects, sound objects and motion video objects, and to send and to receive such multimedia documents via the communication board on one of the multiple telephone lines. The multimedia message management program may also be provided with telephone handset control capabilities with which an operator, through manipulation and use of a computerized address list, may instruct the computer to cause a selected telephone line to go off-hook, a selected telephone number to be dialed, and indicate to the operator that the called party has answered. Incoming calls may also be handled by the computer, and a telephone usage log may be maintained.

Figure 2:
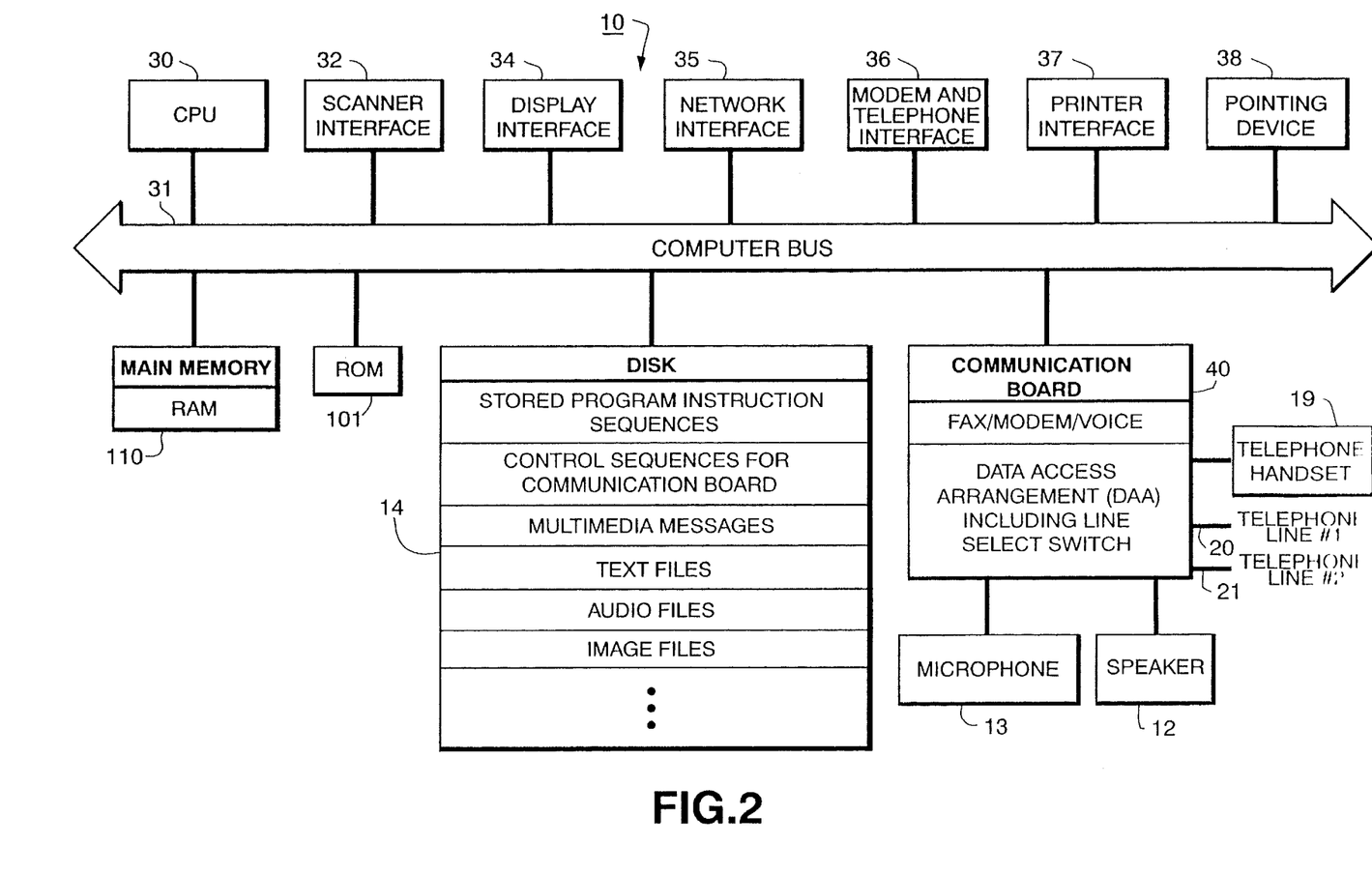
FIG. 2 is a block diagram of the FIG. 1 apparatus.

FIG. 2 is a detailed block diagram showing the internal construction of computing equipment 10. As shown in FIG. 2, computing equipment 10 includes central processing unit (CPU) 30 such as an 80386 or a reduced instruction set computer (RISC) interfaced to computer bus 31. Also interfaced to computer bus 31 is scanner interface 32 for interfacing to scanner 18, display interface 34 for interfacing to display 11, network interface 35 for interfacing to network line 22, printer interface 36 for interfacing to printer 24, keyboard interface 37 for interfacing to keyboard 15, and pointing interface 38 for interfacing to pointing device 16.

Read only memory (ROM) 101 interfaces with computer bus 31 so as to provide CPU 30 with specialized and invariant functions such as start-up programs or BIOS programs. Main memory 110 which includes random access memory (RAM) provides CPU 30 with memory storage both for data and application programs, as required. In particular, when executing stored program instruction sequences such as multimedia message management programs, CPU 30 normally loads those instruction sequences from disk 14 (or other program storage media) to main memory 110 and executes those stored program instruction sequences out of the main memory.

A communication board 40 which includes a data communication device is connected to computer bus 31 so as to provide computing equipment 10 with access to and control over multiple telephone lines and an ordinary telephone handset. The communication board device on 40 preferably includes a combined fax/modem/voice chipset such as the type described in the RC96ACL/RC144ACL Modem Designer's Guide, Rockwell International Digital Communications Division, published 1993, the contents of which are incorporated herein by reference. Such a fax/modem/voice chipset provides a facsimile modem for automatic facsimile transmission and reception, a data modem for automatic data transmission and reception and a digital voice communication capability for digitizing incoming voice communications and storing the digitized voice in a computer file, and/or converting a digitized voice in computer files into analog form for play out over voice telephone lines.

The communication board 40 further includes a data access arrangement (DAA) which includes a line select switch for selecting any one of multiple telephone lines for connection to the fax/modem/voice chipset. The DAA further includes the capability for connecting to external speaker 12 or microphone 13 as well as for connecting to ordinary voice telephone handset 19.

Figure 3:
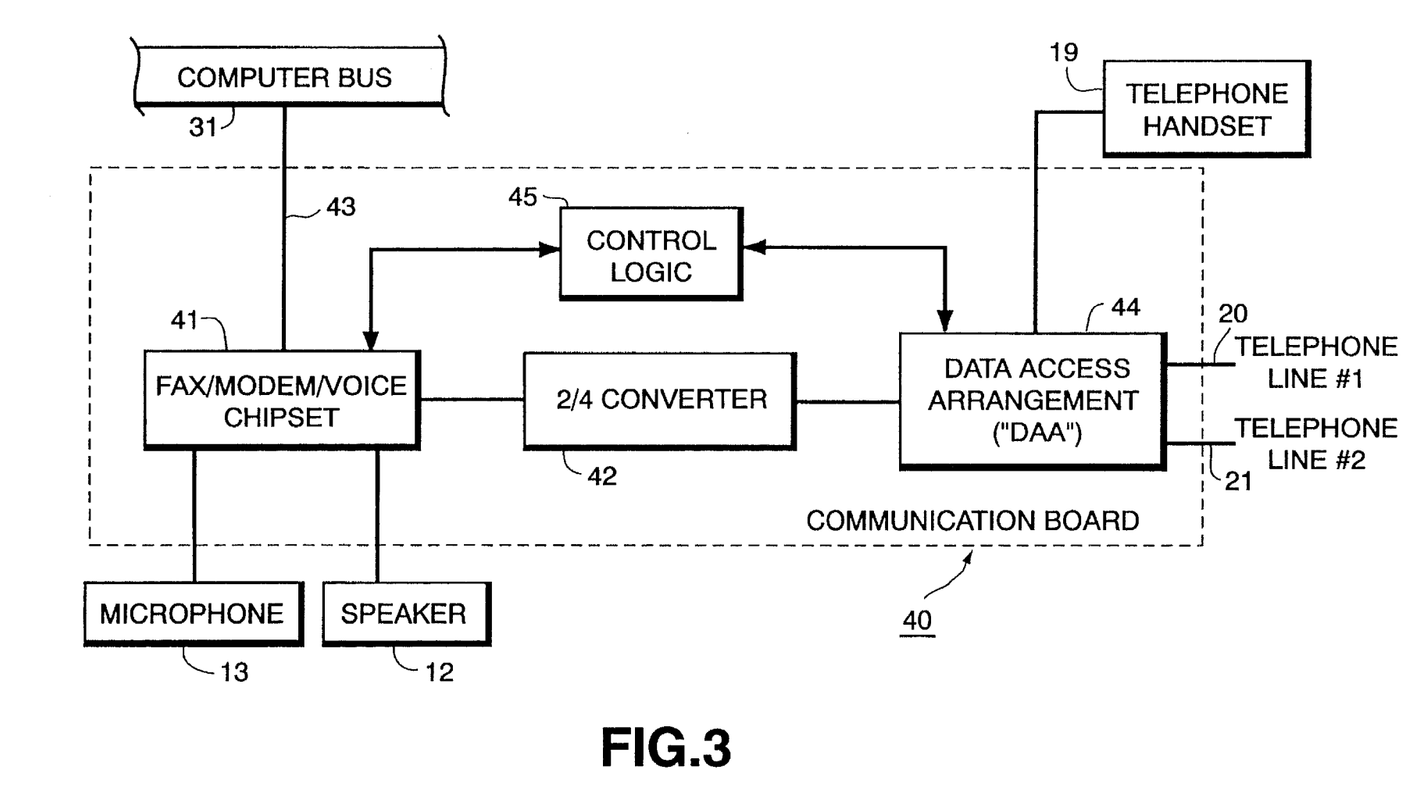
FIG. 3 is a functional block diagram of a communication board according to the invention.

FIG. 3 is a functional block diagram of communication board 40. As shown in FIG. 3, communication board 40 includes a communication device such as the aforementioned fax/modem/voice chipset 41, and a 2/4 converter 42. The 2/4 converter 42 converts a four-Wire signal from the fax/modem/voice chipset 41 into a two-wire signal for connection to ordinary voice telephone lines. The two-wire signal from 2/4 converter 42 is fed to data access arrangement (DAA) 44. The data access arrangement, under control via control logic 45 from chipset 41 and computing equipment 10, switchably connects one of multiple telephone lines, such as telephone lines 20 and 21, to the chipset via the 2/4 converter 42. Additionally, DAA 44 includes handset switches for each telephone line for switchably connecting, under control via control logic 45 from chipset 41 and computing equipment 10, one of the telephone lines to telephone handset 19.

Preferably, and as depicted in FIG. 3, the communication board 40 is arranged on a single, multiple-layer, circuit board provided with an edge connector 43 for connection to computer bus 31, as well as suitable RJ-14 connectors for connection to handset 19 and telephone lines 20 and 21. The single-board construction allows board 40 to be inserted into the housing of conventional PC-type computing equipment. Of course, while a single-board construction is preferred, the communication board 40 may, in fact, be comprised by multiple interconnected circuit boards.

Figure 4:
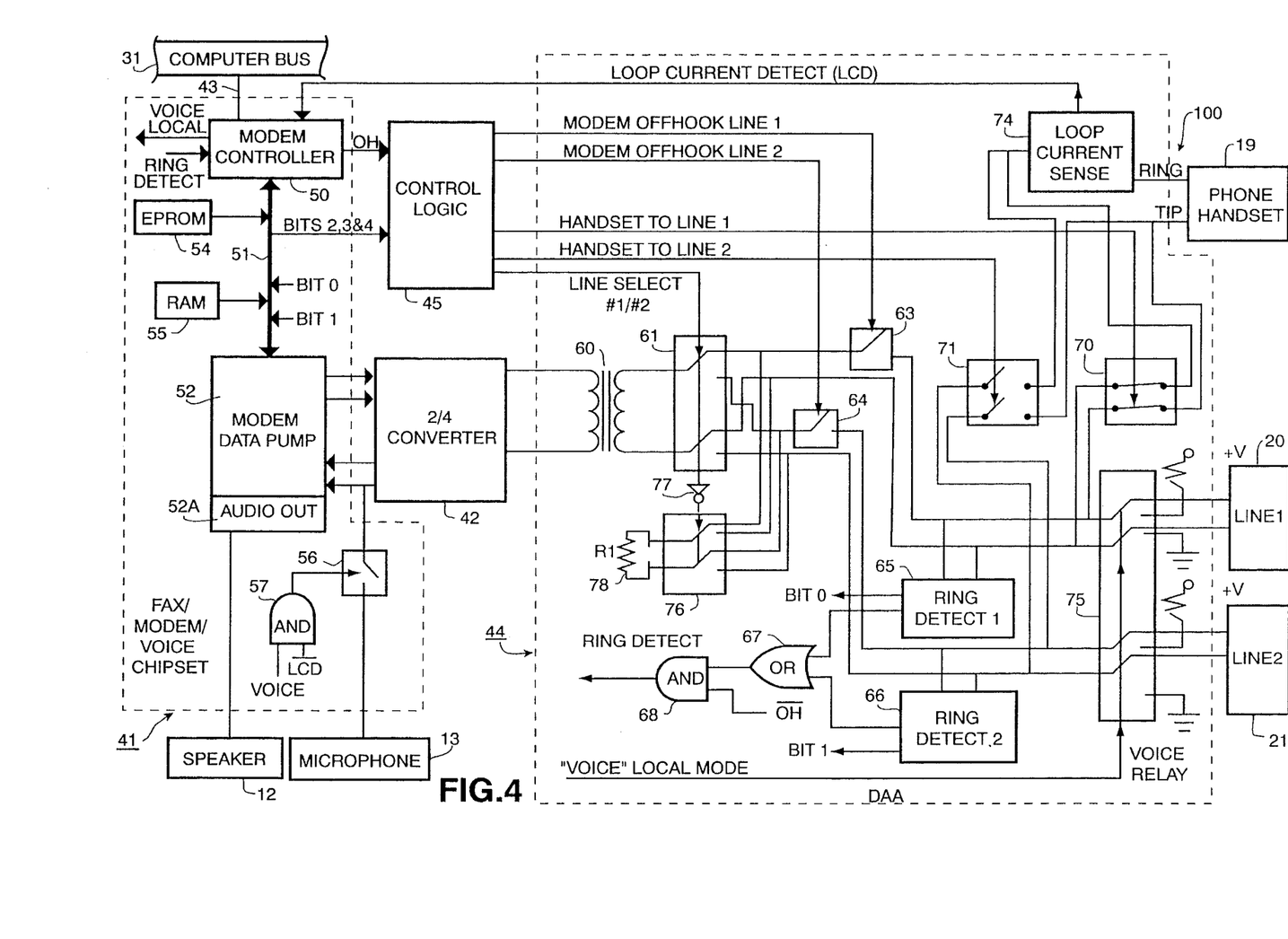
FIG. 4 is a schematic circuit diagram of the communication board shown in FIG. 3.

FIG. 4 is a schematic diagram illustrating the communication board of FIG. 3. As shown in FIG. 4, the fax/modem/voice chipset 41 includes a modem controller 50 connected via modem bus 51 to a modem data pump 52. Also connected to modem bus 51 are EPROM 54 and local RAM 55 which serve as memories for programming and processing operations of the modem and which may have a capacity of 128K bytes each. An audio path in chipset 41 includes an audio output interface portion 52a of the modem data pump which is connectable to speaker 12, as well as an audio-in switch 56 which permits connection to microphone 13 so as to provide the modem data pump 52 with an audio input interface under control of AND device 57.

In operation, modem controller 50, via commands and data sent from computing equipment 10 on computer bus 31, sets its state and the state of the modem data pump to one of audio in, audio out, fax modem, data modem or voice. Then, modem controller 50 causes modem data pump either to output audio signals to speaker 12, to input audio signals from microphone 13, or to transmit or receive fax, modem or voice information via a four-wire connection to 2/4 converter 42.

2/4 converter 42 converts the four-wire connection from modem data pump 52 into a two-wire connection to data access arrangement (DAA) 44.

As further shown in FIG. 4, DAA 44 includes a transformer 60 for impedance-matching the two-wire signal from 2/4 converter 42 to the impedance of an ordinary voice telephone line. A line select switch 61 is provided to select one of multiple telephone lines, here two lines designated 20 and 21, respectively. The line selector switch 61 is operated under control from modem control logic 45 so as to select either of the two lines.

Each of the telephone lines has connected in series therewith a modem off-hook switch, specifically modem off-hook switch 63 for line 20 and 64 for line 21. Under control from control logic 45, each of those switches may be activated so as to cause the selected line to go off-hook with respect to fax/modem/voice chipset 41 when line select switch 61 has selected that line.

Ring detect circuits 65 and 66 detect ringing signals on each of lines 20 and 21, respectively. In response to a ringing signal, each ring detect circuit sets a bit in an unshown computer register indicating which of the lines 20 and 21 is ringing. In addition, the ring detect signals are ORed together via OR gate 67 and the resultant ORed signal sent to AND gate 68. The resultant ring detect signal is sent to modem controller 50 whereby modem controller 50 can recognize when one of line 20 and 21 is ringing. In this regard, AND gate 68 is provided so that a ring detect signal is blocked when modem controller 50 is engaged in modem operations. Thus, when either of lines 20 or 21 is off-hook via off-hook switches 63 and 64, an off hook signal OH is generated by modem controller 50. The OH signal blocks a ring detect signal in the event that either line is off-hook, thereby preventing modem controller 50 from being interrupted from its modem operations when one of the lines is off-hook and engaged in modem operations.

The DAA further includes for each telephone line a handset switch 70 and 71 for connecting lines 20 and 21, respectively, to telephone handset 19 via handset interface 100. The handset switches 70 and 71 are operated under control of control logic 45 via "handset to line 1" and "handset to line 2" control signals. These signals are set such that only one telephone line is connected to telephone handset 19 at any one time, and preferably they are set such that if data communications are being conducted on one telephone line, the handset is not connected to that line.

A loop current detect device 74 is positioned between the ring and tip wires of telephone handset 19 so as to sense a loop current when the handset in telephone handset 19 is lifted. If a loop current is detected, then loop current detect device 74 sends a loop current detect (LCD) signal to modem controller 50 and to AND gate 57.

Telephone handset 19 is operable in either a manual mode or a computer-controlled mode. In the manual mode, when telephone handset 19 is lifted, it is connected to one of telephone lines 20 or 21 in accordance with the setting of handset switches 70 and 71. Manual outgoing dialing and voice communication may then occur.

For computer-controlled outgoing dialing, computing equipment 10 first causes modem controller 50 to select the desired lines 20 or 21 via line select switch 61. The appropriate one of off-hook switches 63 or 64 is then closed and the modem controller 50 causes modem data pump 52 to initiate telephone dialing such as DTMF or pulse dialing over the selected line. Handset switches 70 and 71 are set in accordance with the selected line, and the user is then instructed to lift the handset from telephone handset 19. As soon as loop current detect (LCD) signal is detected, indicating the presence of loop current between the tip and ring wires of telephone handset 19, modem controller 50 disconnects both of off-hook switches 63 and 64 to permit the user to conduct ordinary voice communication. If the user does not lift the handset from telephone handset 19, then the LCD signal will not be detected, and when the called party answers, the fax/modem/voice chipset 41 will operate in accordance with its ordinary programming.

For incoming calls, ring detect circuits 65 and 66 detect that one of the telephone lines carries a ringing signal, and signals that detection to modem controller 50 via AND gate 68. Computing equipment 10 reads its unshown computer register to determine which line is ringing, and control logic 45 then switches line select switch 61 to the appropriate line. In addition, control logic 45 sets handset select switches 70 or 71 to the ringing line. If, after a predetermined period such as two rings, the LCD signal is not detected indicating that the user has not lifted the handset, then control logic 45 causes the ringing line to go off-hook by setting modem off-hook switches 63 or 64, as appropriate. The fax/modem/voice chipset then operates in accordance with its pre-programmed instructions. Ordinarily, computing equipment 10 is programmed such that if the LCD signal is detected by the user lifting the handset from telephone handset 19, off-hook switches 63 and 64 are both disconnected leaving the user in ordinary voice communication with the calling party.

As mentioned above, if the fax/modem/voice chipset 41 is engaged in data communications via one of telephone lines 20 or 21, then the ring detect signal to chipset 41 is blocked via AND gate 68 because of the existence of the OH signal. Because the ring detect signal is blocked, chipset 41 will not be interrupted in its fax or modem or voice communications. At the same time, because handset switches 70 and 71 are ordinarily set to the unused telephone line, any incoming calls on that line will activate the ringer in telephone handset 19 thus alerting the user aurally to the presence of such a ringing signal.

DAA 44 further includes a voice relay 75 for setting DAA 44 to a voice local mode. In the voice local mode, voice relay 75 is activated to disconnect DAA 44 from all telephone lines and to connect the DAA to a $V^+$ voltage supply. In the voice local mode, the communication board can be used to play out sound over either speaker 12 or the speaker in telephone handset 19, or to record sound either from microphone 13 or from the microphone in telephone handset 19.

More specifically, when the voice local mode is desired, a voice local mode signal is sent from modem controller 50 to voice relay 75 thereby disconnecting DAA 44 from all telephone lines and reconnecting it to $V^+$. Thereafter, sound from modem data pump 52 may be heard over speaker 12 or the speaker in telephone handset 19. At the same time, sound may be recorded from either microphone 13 or from the microphone in telephone handset 19. In this regard, using loop current detect signal LCD, AND gate 57 will block recordal of sound from microphone 13 in the case that the handset has been lifted from the telephone handset 19 thereby preventing sound from being recorded from both the telephone handset and microphone 13 at the same time.

Relay 76 operates to force a busy signal on unselected ones of the multiple telephone lines. Thus, as shown in FIG. 4, relay 76 is connected to each of the telephone lines between the line select switch 61 and off-hook switches 63 and 64. The relay 76 is actuated through inverter 77 by the line select signal from control logic 45, and operates to connect the unused telephone line to resistor R1. Force busy is obtained by closing the off-hook switch for the unselected telephone lines, thereby connecting the telephone line to resistor R1 which has a value, e.g., 100 Ω, low enough to indicate to the telephone central office that the unused telephone line is busy. As an operational example, if line select switch 61 is set to select line #1, then because of inverter 77 force busy relay 76 connects resistor R1 to line #2. To force busy on line #2, control logic 45 causes modem off-hook switch 64, corresponding to line #2, to close. The telephone central office "sees" resistor R1 and interprets that resistor as an indication that line #2 is busy. Thus, callers calling into line #2 will receive a busy signal even though no physical telephone equipment (e.g., telephone handset 19 or chipset 41) is connected to line #2.

As mentioned above, control of the communication board is accomplished through bit settings in an unshown computer register. The following tables I and II show those bit settings:

TABLE I

I/O WRITE TO CONFIGURATION REGISTER (BASE +0)

| 7 | 6 | 5 | 4 | 3 | 2 | 1 | 0 |
|---|---|---|---|---|---|---|---|

- comm port setting
- 0: don't force busy on unselected lines
  1: force busy on unselected lines
- 0: handset to line #1
  1: handset to line #2
- 0: line select to line #1
  1: line select to line #2
- IRQ setting

TABLE II

I/O READ CONFIGURATION REGISTER +2 (BASE +2)

| 7 | 6 | 5 | 4 | 3 | 2 | 1 | 0 |
|---|---|---|---|---|---|---|---|

- line 1 ringing
- line 2 ringing

Figure 5:
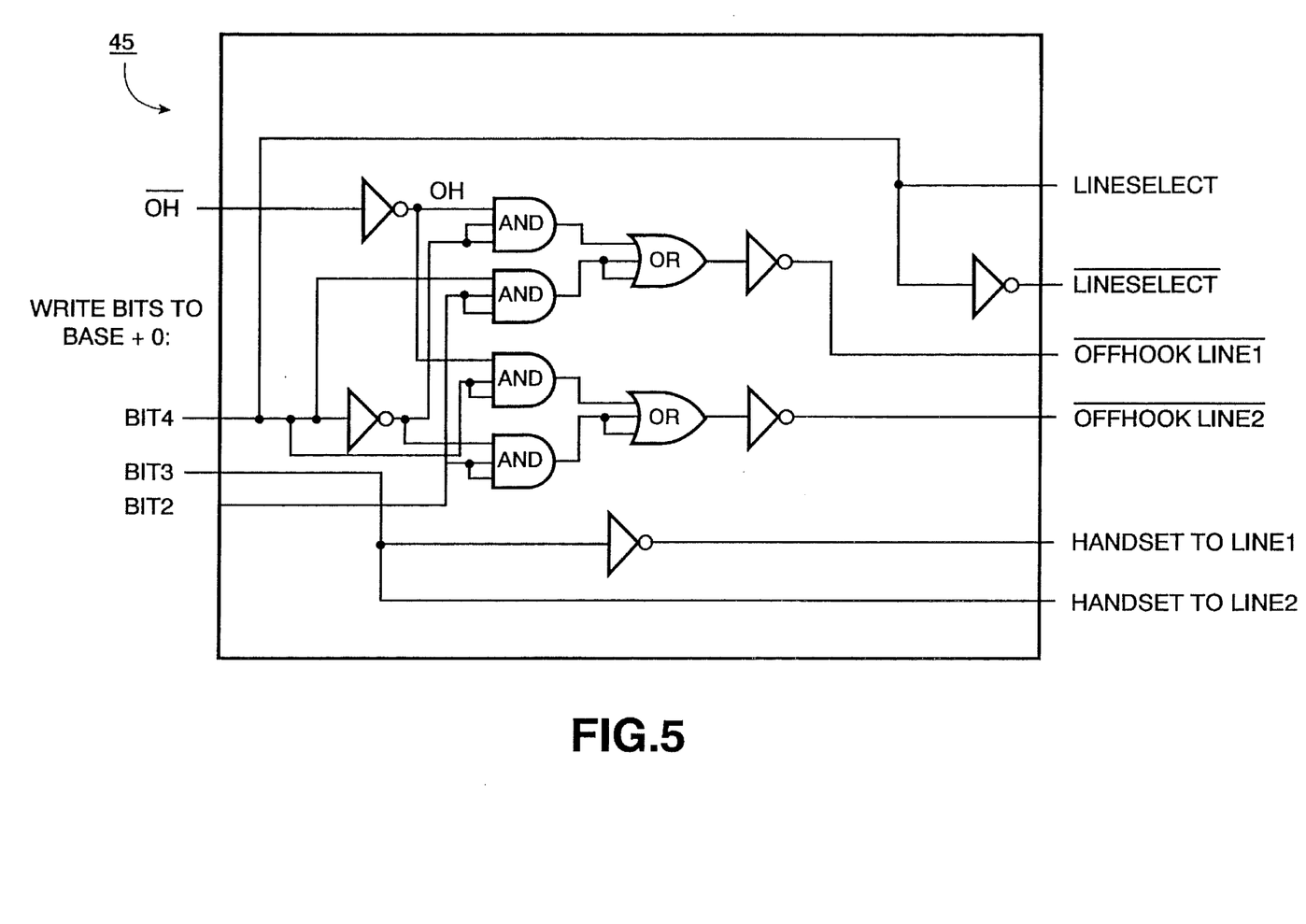
FIG. 5 is a schematic circuit diagram of the control logic shown in FIG. 4.

FIG. 5 is a detailed schematic diagram of control logic 45. As shown in FIG. 5, control logic 45 accepts the off-hook signal OH from modem controller 50 and combines it, using OR and AND gate logic circuitry, with control bits 2, 3 and 4 from "BASE +0" register so as to obtain the line select signal for line select switch 61, the modem off-hook signals for off-hook switches 63 and 64, and the handset signals for handset switches 70 and 71. The logic circuitry implements the following boolean equations:

LINE SELECT= BIT4

OFFHOOK LINE 1=(OH•$\overline{BIT4}$)+(BIT2•BIT4)

OFFHOOK LINE 2=(OH•BIT4)+(BIT2•$\overline{BIT4}$)

HANDSET TO LINE 1=$\overline{BIT3}$

HANDSET TO LINE2=BIT3

More simply, as shown in Table I above, bit 3 controls handset switches 70 and 71, and bit 4 controls line select switch 61. As for off-hook switches 63 and 64, off-hook switch 63 (corresponding to line #1) is closed if modem controller 50 signals to go off-hook by raising off-hook signal OH and if line #1 is selected (i.e., bit 4=0), and also if line #2 is selected (i.e., bit 4=1) and bit 2 is set to force busy on unselected lines. Likewise, off-hook switch 64 (corresponding to line #2) is closed if modem controller 50 signals to go off-hook by raising off-hook signal OH and if line #2 is selected (i.e., bit 4=1), and also if line #1 is selected (i.e., bit 4=0) and bit 2 is set to force busy on unselected lines.

In operation, and in response to an incoming call on any of the phone lines, the system preferentially activates the data communication device, here the modem/fax/voice chipset, while activating the handset when the communication device is busy. In addition, the communication device is protected from unwanted interruptions while allowing a user manually to respond to incoming phones via the telephone handset 19. It is also possible to block incoming calls by forcing unused lines to a busy state. Such functionality is preferred in an unattended state where a user is unable to respond manually to incoming telephone calls while the communication device is in use. The reason why such functionality is desirable is because a caller calling an unattended station may become aggravated at an unanswered telephone line and will be less aggravated if a busy signal is instead obtained. In addition, automatic message dialing systems, such as remote facsimile machines, ordinarily have re-try modes for message dialing, and those re-try modes are activated only if a busy signal is obtained. Of course, it is possible to replace telephone handset 19 with an ordinary voice telephone answering machine to accommodate unattended operation.

In general, after detecting a ring detect signal, computing equipment 10 performs an I/O read of its 'BASE+2" register to determine which line is ringing. As shown in the above Table II, if bit 0 is set, then line 1 is ringing while if bit 1 is set then line 2 is ringing. After determining which line is ringing, the handset is moved to the ringing line by setting the appropriate one of handset switches 70 and 71. Then, by performing an I/O write to bit 4 of the "BASE+0" register, as shown in the above Table I, line select switch 61 is set to the ringing line, and by performing an I/O write to the BASE+0 register, the appropriate one of modem off-hook switches 63 and 64 is set to the ringing line. The call is then answered via chipset 41 or by the user lifting the handset of telephone handset 19, which action is detected by modem controller 50 through the loop current detect (LCD) signal, as described hereinabove.

Specific operations taking into consideration the current state of the telephone handset and the fax/modem/voice chipset are described as follows:

(Incoming Call On Line 1)

If neither the fax/modem/voice chipset 41 nor telephone handset 19 is in use, then computing equipment 10 connects both chipset 41 and telephone handset 19 to line 1 as described hereinabove.

If chipset 41 is not in use but line 2 is in use by telephone handset 19, then computing equipment 10 connects chipset 41 to line 1.

If chipset 41 is currently conducting communications on line 2, and telephone handset 19 is not in use, then computing equipment 10 moves telephone handset 19 to line 1 for attended voice operation. Alternatively, by setting bit 2 of "BASE 0", which causes unselected lines to appear "busy" to the telephone central office, it is possible to force busy on line 1 for unattended operation.

If both the modem and the phone handset are conducting communication on line 2, then line 1 is forced busy by setting bit 2, as described above.

(Incoming Call On Line 2)

If neither chipset 41 and telephone handset 19 are in use, computing equipment 10 connects both chipset 41 and telephone handset 19 to line 2.

If chipset 41 is conducting communication on line 1, and telephone handset 19 is not in use, then computing equipment 10 connects telephone handset to line 2 for attended operation. Alternatively, it is possible to force busy on line 2 by setting bit to of "BASE+0" register for unattended operation.

If chipset 41 is not in use but telephone handset 19 is in use with line 1, then computing equipment 10 connects chipset 41 to line 2.

If both chipset 41 and telephone handset 19 are conducting communication on line 1, then line 2 is forced busy by setting bit 2 of "BASE+0" register.

(Outgoing Calls From Chipset 41)

For an outgoing call by chipset 41, then computing equipment 10 preferentially connects chipset 41 to the first available line, i.e., first line 1 or if line 1 is in use then to line 2. Alternatively, it is possible for computing equipment 10 to override this automatic selection by appropriate writes to bits in the "BASE+0" register.

(Outgoing Calls From Handset 19)

For outgoing calls on telephone handset 19, then if neither telephone line is in use, computing equipment 10 connects telephone handset 19 in reverse preferential order to that of chipset 41. Thus, computing equipment 10 first connects telephone handset 19 to line 2, or if line 2 is in use by chipset 41 then to line 1.

In the event of an outgoing call from the telephone handset while line 1 or line 2 is in use by chipset 41 it is possible for computing equipment 10 to allow the user to "break into" the phone call by chipset 41. In this instance, computing equipment 10 forces handset switches 70 and 71 into their appropriate state and allows the user to break into the line by lifting the handset.

In summary, for the above situation, the "preferential order" for selecting one of the telephone lines for connection to the data communication device is line 1 followed by line 2. Accordingly, the "reverse preferential order" for selecting one of the telephone lines for connection to the telephone handset is line 2 followed by line 1.

What is claimed is:

1. A communication board operable under computer control so as to select a two-wire signal from any one of multiple telephone lines, said communication board comprising:

a 2/4 converter having a two-wire connection and a four-wire connection, said four-wire connection being connectable to a four-wire signal from a data communication device; and a data access arrangement having a line select switch interposed between the two-wire connection of said 2/4 converter and said multiple telephone lines, said data access arrangement operable under computer control to switchably select the two-wire signal from any one of said multiple telephone lines so as to electrically connect the selected two-wire signal from any of said multiple telephone lines to said two-wire connection of said 2/4 converter.

2. A communication board according to claim 1, wherein said data access arrangement includes a transformer interposed between said line select switch and said two-wire connection of said 2/4 converter, said transformer providing impedance matching between the selected two-wire signal from any of said multiple telephone lines and the two-wire connection of said 2/4 converter.

3. A communication board according to claim 1, wherein said communication device is comprised by a fax/modem/voice chipset.

4. A communication board according to claim 1, further comprising force busy means which operates in dependence on which of said multiple telephone lines is selected by said line select switch so as to force a telephone busy condition on unselected ones of said multiple telephone lines.

5. A communication board operable under computer control, said communication board comprising:

a data access arrangement for accessing multiple telephone lines each of which includes a tip and ring wire, said data access arrangement including a line select switch which switchably connects the tip and ring wires of a selectable one of said multiple telephone lines to a two-wire output of said data access arrangement; and a 2/4 converter for converting the two-wire output from said data access arrangement to four-wire communication so as to permit interface between a four-wire data communication device and the selectable one of the multiple telephone lines.

6. A communication board according to claim 5, wherein said data communication device is comprised by a fax/modem/voice chipset.

7. A communication board according to claim 5, further comprising an off-hook switch for each of said multiple telephone lines, each off-hook switch being positioned in series with its respective phone line and being operable under computer control to cause a telephone line, which is selected by said line select switch, to go off-hook.

8. A communication board according to claim 7, further comprising a ring detect means for each of said multiple telephone lines, wherein in response to ring detection, said line select switch is caused to switch to one of said multiple telephone lines that is ringing and said off-hook switch for said one of said multiple telephone lines that is ringing is switched to an off-hook position.

9. A communication board according to claim 8, further comprising means for blocking ring detect signal in the case where the data communication device is engaged in data communication.

10. A communication board according to claim 7, further comprising force busy means connected between said off-hook switches and said line select switch, said force busy means operating in dependence on which of said multiple telephone lines is selected by said line select switch so as to force a telephone busy condition on unselected ones of said multiple telephone lines.

11. A communication board according to claim 10, wherein said force busy means is comprised by a relay, and wherein the telephone busy condition is forced on unselected ones of said multiple telephone lines whose off-hook switches are actuated.

12. A communication board according to claim 5, further comprising one handset switch for each of said multiple telephone lines, each said handset switch for switching its respective telephone line to a telephone handset interface.

13. A communication board according to claim 12, further comprising a loop current detector for detecting loop current at said telephone handset interface.

14. A communication board according to claim 13, wherein said data communication device includes an audio input interface, said audio input interface being selectively blocked in accordance with loop current detection.

15. A communication board according to claim 13, wherein said telephone handset interface is connected to one of said multiple telephone lines in response to loop current detection.

16. A communication board according to claim 5, further comprising a transformer interposed between said 2/4 converter and said line select switch, said transformer for matching impedance from said 2/4 converter to that of said multiple telephone lines.

17. A communication board according to claim 5, further comprising a voice relay for disconnecting all of said multiple telephone lines from said data access arrangement.

18. A communication board according to claim 5, further comprising a first microphone connectable to the data communication device, a telephone handset which includes a second microphone and which is also connectable to the data communication device, and a loop current detector for detecting loop current at said telephone handset, wherein only one of the first and second microphones are operable in accordance with loop current detection.

19. A telephone communication apparatus comprising:

computing equipment programmed to send and to receive telephone communication over any one of multiple telephone lines using a data communication device; and a communication board connected to said computing equipment and responsive to program control from said computing equipment so as to select any one of said multiple telephone lines, said communication board being comprised by a 2/4 converter having a two-wire connection and a four-wire connection, said four-wire connection connected to a four-wire signal from the data communication device, and a data access arrangement having a line select switch interposed between the two-wire connection of said 2/4 converter and said multiple telephone lines, said line select switch operable under computer control to switchably select a two-wire signal from any one of said multiple telephone lines so as to electrically connect the selected two-wire signal from any one of said multiple telephone lines to said two-wire connection of said 2/4 converter.

20. Apparatus according to claim 19, wherein said data communication device is comprised by a fax/modem/voice chipset.

21. Apparatus according to claim 19, further comprising one off-hook switch for each of said multiple telephone lines, each off-hook switch being positioned in series with its respective phone line and being operable under computer control to cause a telephone line, which is selected by said line select switch, to go off-hook.

22. Apparatus according to claim 21, further comprising a ring detect means for each of said multiple telephone lines, wherein in response to ring detection, said line select switch is caused to switch to one of said multiple telephone lines that is ringing and said off-hook switch for said one of said multiple telephone lines that is ringing is switched to an off-hook position.

23. Apparatus according to claim 22, further comprising means for blocking ring detect signal in the case where the communication device is engaged in data communication.

24. Apparatus according to claim 21, further comprising force busy means connected between said off-hook switches and said line select switch, said force busy means operating in dependence on which of said multiple telephone lines is selected by said line select switch so as to force a telephone busy condition on unselected ones of said multiple telephone lines.

25. Apparatus according to claim 24, wherein said force busy means is comprised by a relay, and wherein the telephone busy condition is forced on unselected ones of said multiple telephone lines whose off-hook switches are actuated.

26. Apparatus according to claim 19, further comprising one handset switch for each of said multiple telephone lines, each said handset switch for switching its respective telephone line to a telephone handset interface.

27. Apparatus according to claim 26, further comprising a loop current detector for detecting loop current to said telephone handset interface.

28. Apparatus according to claim 27, wherein said data communication device includes an audio input interface, said audio input interface being selectively blocked in accordance with loop current detection.

29. Apparatus according to claim 27, wherein said telephone handset interface is connected to one of said multiple telephone lines in response to loop current detection.

30. Apparatus according to claim 19, further comprising a transformer interposed between said 2/4 converter and said line select switch, said transformer for matching impedance from said 2/4 converter to that of said multiple telephone lines.

31. Apparatus according to claim 19, further comprising a voice relay for disconnecting all of said multiple telephone lines from said data access arrangement.

32. Apparatus according to claim 19, further comprising a first microphone connectable to the data communication device, a telephone handset which includes a second microphone and which is also connectable to the data communication device, and a loop current detector for detecting loop current at said telephone handset, wherein only one of the first and second microphones are operable in accordance with loop current detection.

33. A control method for controlling telephonic communications between multiple telephone lines and at least one telephone handset and at least one data communication device, said control method comprising the steps of:

a data-communication-line-selecting step of selecting one of said multiple telephone lines as a first-selected signal for connection to said data communication device in a first preferential order which determines which of said multiple telephone lines said first-selected signal is selected from; and a handset-line-selecting step of selecting another one of said multiple telephone lines as an second-selected signal for connection to said telephone handset, wherein said handset-line-selecting step selects one of said multiple telephone lines in a second preferential order which determines which of said multiple telephone lines said second-selected signal is selected from, said second preferential order being in reversed order from said first preferential order.

34. A method according to claim 33, further comprising a step of conducting data communication by said communication device over the selected one of said multiple telephone lines.

35. A method according to claim 34, wherein said step of conducting data communication is preceded by a step of closing an off-hook switch.

36. A method according to claim 34, further comprising a step of connecting said telephone handset to an unused one of said multiple telephone lines in accordance with said second preferential order.

37. A method according to claim 34, further comprising a step of forcing busy on unused ones of said multiple telephone lines.

38. A method according to claim 37, further comprising a step of connecting a low resistance resistor across tip and ring wires of unused ones of said multiple telephone lines.

39. A method according to claim 33, wherein said data-communication-line-selecting step includes a step of switching a line select switch so as to connect a two-wire data access arrangement to a four-wire data communication device via a 2/4 converter.

40. A method according to claim 33, wherein said handset-line-selecting step includes the step of selectively switching a respective one of plural handset select switches.

41. A control method for controlling telephonic communications between multiple telephone lines and at least one telephone handset and at least one data communication device, said control method comprising the steps of:

detecting a ring signal on one of said multiple telephone lines;

determining which of said multiple telephone lines is a ringing telephone line;

connecting a handset switch to said ringing telephone line;

moving a line select switch for said at least one data communication device to said ringing telephone line;

transmitting a two-wire signal from said ringing telephone line from said line select switch to a two-wire connection of a 2/4 converter; and transmitting a four-wire signal from a four-wire connection of said 2/4 converter to said at least one data communication device.

42. A method according to claim 41, wherein the detecting step includes a step of writing a bit indicative of said ringing telephone line to a computer register.

43. A method according to claim 42, wherein the determining step includes a step of reading bits in said computer register.

44. A method according to claim 41, further comprising a step of detecting loop current in the telephone handset in the case that said telephone handset goes off-hook.

45. A method according to claim 44, further comprising a step of going off-hook for said at least one data communication device in the case that loop current is not detected within a predetermined period.

46. A method according to claim 45, further comprising a step of going on-hook for said at least one data communication device in the case that loop current is detected after going off-hook for said at least one data communication device.

47. A method according to claim 41, further comprising a step of going off-hook for the data communication device.

48. A method according to claim 47, further comprising a step of blocking ring detect signals in a case where said data communication device is off-hook.

49. A method according to claim 47, further comprising a step of moving the handset switch to an unselected line in a case where the data communication device is off-hook.

* * * * *